United States Patent
Frank et al.

(10) Patent No.: US 8,943,372 B2
(45) Date of Patent: Jan. 27, 2015

(54) SYSTEMS AND METHODS FOR OPEN AND EXTENSIBLE INTEGRATION OF MANAGEMENT DOMAINS IN COMPUTATION AND ORCHESTRATION OF RESOURCE PLACEMENT

(75) Inventors: David C. Frank, Ossining, NY (US); Richard E. Harper, Chapel Hill, NC (US); Jeffrey Lucash, Hurley, NY (US); Kyung D. Ryu, New City, NY (US); Ravi A. Shankar, Austin, TX (US); Thomas Weaver, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/435,121

(22) Filed: Mar. 30, 2012

(65) Prior Publication Data

US 2013/0262915 A1    Oct. 3, 2013

(51) Int. Cl.
*G06F 11/16*    (2006.01)

(52) U.S. Cl.
USPC ........................................................ 714/47.1

(58) Field of Classification Search
CPC ............ H04L 41/0806; H04L 41/0856; H04L 41/0896; H04L 63/10; H04L 67/104; H04L 67/1097; H04L 41/0663; H04L 12/24; H04L 67/10; G06F 11/3409; G06F 11/3433; G06F 2201/81; G06F 9/50; G06F 9/5011
USPC ........................................................ 714/1–57
See application file for complete search history.

(56) References Cited

U.S. PATENT DOCUMENTS

| | | | |
|---|---|---|---|
| 6,144,999 A | 11/2000 | Khalidi et al. | 709/219 |
| 7,281,168 B1 | 10/2007 | Coates et al. | 714/43 |
| 7,669,080 B2 * | 2/2010 | Lind et al. | 714/11 |
| 7,720,551 B2 | 5/2010 | Tantawi et al. | 700/1 |
| 7,788,671 B2 | 8/2010 | Black-Ziegelbein et al. | 718/105 |
| 7,971,094 B1 * | 6/2011 | Benn et al. | 714/13 |
| 8,135,930 B1 * | 3/2012 | Mattox et al. | 711/162 |
| 8,201,180 B2 * | 6/2012 | Briscoe et al. | 718/104 |
| 8,578,202 B2 * | 11/2013 | Li et al. | 714/4.11 |
| 2003/0154236 A1 | 8/2003 | Dar et al. | 709/201 |
| 2004/0010731 A1 * | 1/2004 | Yu et al. | 714/4 |
| 2006/0161805 A1 * | 7/2006 | Tseng et al. | 714/6 |
| 2006/0242647 A1 | 10/2006 | Kimbrel et al. | 718/104 |
| 2008/0052719 A1 * | 2/2008 | Briscoe et al. | 718/104 |
| 2008/0109448 A1 | 5/2008 | Aboel-Nil et al. | 707/10 |

(Continued)

OTHER PUBLICATIONS

Arshad, Naveed; "A Planning-Based Approach to Failure Recovery in Distributed Systems," B.S., Ghulam Ishaq Khan Institute of Engineering Sciences and Technology, Pakistan, 1999; M.S., University of Colorado at Boulder, USA 2003; Thesis for degree of Docktor of Philosophy Department of Computer Science submitted to the University of Colorado 2006 (215 pages).

(Continued)

*Primary Examiner* — Nadeem Iqbal
(74) *Attorney, Agent, or Firm* — Harrington & Smith

(57) ABSTRACT

An aspect of this invention is a method that includes evaluating a computing environment by performing auditing of a fault tolerance ability of the computing environment to tolerate each of a plurality of failure scenarios; constructing a failover plan for each of the plurality of scenarios; identifying one or more physical resource limitations which constrain the fault tolerance ability; and identifying one or more physical resources to be added to the computing environment to tolerate each of the plurality of failure scenarios.

21 Claims, 11 Drawing Sheets

(56) References Cited

U.S. PATENT DOCUMENTS

| | | | |
|---|---|---|---|
| 2008/0189468 A1* | 8/2008 | Schmidt et al. | 711/6 |
| 2008/0189700 A1* | 8/2008 | Schmidt et al. | 718/1 |
| 2009/0157855 A1 | 6/2009 | Adam et al. | 709/221 |
| 2010/0064168 A1* | 3/2010 | Smoot et al. | 714/6 |
| 2013/0326261 A1* | 12/2013 | Paulson | 714/4.11 |

OTHER PUBLICATIONS

Urgaonkar, Bhuvan, et al; "Application Placement on a Cluster of Servers (extended abstract)," Department of Computer Science, University of Massachusetts, Amherst, MA 01003, Aug. 2004 (6 pages).

Coffman, E.G., et al.; "Approximation Algorithms for Bin packing: A Survey," Appears in *Approximation for NP-Hard Problems*, D. Hochbaum (ed.), PWS Publishing, Boston (1996), 46-93, (54 pages).

Hanemann, Andreas, et al.; "A Framework for Failure Impact Analysis and Recovery with Respect to Service level Agreements," Services Computing, 2005 IEEE International Conference on Services Computing; Issue Date: Jul. 11-15, 2005 ; On pp. 49-56 vol. 2 (8 pages).

Harper, Richard E., et al.; "A Virtual Resource Placement Service," Dependable Systems and Networks Workshops (DSN-W), 2011; Issue Date: Jun. 27-30, 2011; On pp. 158-163 (6 pages).

Kimbrel, Tracy, et al.; "Dynamic application placement under service and memory constraints," WEA'05 Proceedings of the 4th international conference on Experimental and Efficient Algorithms table of contents; Sotiris E. NikoletseasCTI and Univ. of Patras, Greece; pp. 391-402; DELIS EU-FET R&D project "Dynamically Evolving, Large-Scale Information Systems" and FLAGS EU-FET R&D project "Foundational Aspects of Global Computing Systems" and Ministry of Natural Education and Religious Affairs Ministry of Natural Education and Religious Affairs and RACTI Research Academic Computer Technology Institute; Springer-Verlag Berlin, Heidelberg © 2005 (10 pages).

Tang, Chunqiang, et al.; "A Scalable Application Placement Controller for Enterprise Data Centers," Track/2007 : Performance and Scalability; Session: Performance Engineering of Web Applications (10 pages).

Tomek, A., et al. "Virtual Resource Placement Services (VRPS)," IBM Academy of Technology Second Conference on Virtualization, Sep. 23-25, 2008 (62 pages).

Linux-Ha—Providing Open Source High-Availability Software for Linux and other Platforms since 1999; http://www.linux-ba.org/wiki/Main_page; last modified Feb. 28, 2011 (1 page).

Power-Ha—High Availability with IBM PowerHA; http://www-03.ibm.com/systems/power/software/availability/resources.html#i5os (1 page).

Harper, Richard E., et al.; "DynaPlan: Resource placement for application-level clustering," dsnw, pp. 271-277, 2011 IEEE/IFIP 41st International Conference on Dependable Systems and Networks Workshops, 2011 (6 pages).

U.S. Appl. No. 12/963,646, filed Dec. 9, 2010.

* cited by examiner

SYSTEMS AND METHODS FOR OPEN AND EXTENSIBLE INTEGRATION OF MANAGEMENT DOMAINS IN COMPUTATION AND ORCHESTRATION OF RESOURCE PLACEMENT

TECHNICAL FIELD

The exemplary embodiments of this invention relate generally to methods, systems and computer program products configured to provide open and extensible integration of management domains in computation and orchestration of resource placement.

BACKGROUND

High Availability (HA) clustering technology is used to improve the availability of an application by continuously monitoring the application's resources and physical server environment, and then invoking recovery procedures when failures occur. In order for such procedures to provide recovery from physical server failures, one or more backup physical servers must be designated as a failover target for each resource that could be affected by a failure. The determination of appropriate failover targets in present-day HA clustering technology is rudimentary, generally limited to ensuring that user-specified resource location, collocation, and anticollocation constraints are met. More advanced failover planning is equipped to fail resources over to the lightest loaded physical server. Other HA clustering systems can equitably distribute the resources across all nodes. In view of the foregoing considerations, there is a need for improved failover systems that distribute failed resources in an optimal manner.

SUMMARY

In one aspect thereof the exemplary embodiments of this invention provide a method that includes receiving one or more constraints; calculating a failover plan comprising a placement of application resources on a failover target comprising one or more servers for each of a plurality of possible failure scenarios, wherein the failover plan does not violate any of the one or more constraints; and executing the failover plan at the failover target.

In another aspect thereof the exemplary embodiments of this invention provide a method that includes evaluating a computing environment by performing auditing of a fault tolerance ability of the computing environment to tolerate each of a plurality of failure scenarios, constructing a failover plan for each of the plurality of scenarios, identifying one or more physical resource limitations which constrain the fault tolerance ability, and identifying one or more physical resources to be added to the computing environment to tolerate each of the plurality of failure scenarios.

In another aspect thereof, the exemplary embodiments provide a computer-readable memory that contains computer program instructions, where the execution of the computer program instructions by at least one data processor results in performance of operations that comprise receiving one or more constraints; calculating a failover plan comprising a placement of application resources on a failover target comprising one or more servers for each of a plurality of possible failure scenarios, wherein the failover plan does not violate any of the one or more constraints; and executing the failover plan at the failover target.

In another aspect thereof, the exemplary embodiments provide a computer-readable memory that contains computer program instructions, where the execution of the computer program instructions by at least one data processor results in performance of operations that comprise evaluating a computing environment by performing auditing of a fault tolerance ability of the computing environment to tolerate each of a plurality of failure scenarios, constructing a failover plan for each of the plurality of scenarios, identifying one or more physical resource limitations which constrain the fault tolerance ability, and identifying one or more physical resources to be added to the computing environment to tolerate each of the plurality of failure scenarios.

In yet another aspect thereof, the exemplary embodiments provide a data processing system that comprises at least one data processor connected with at least one memory that stores computer program instructions for receiving one or more constraints; calculating a failover plan comprising a placement of application resources on a failover target comprising one or more servers for each of a plurality of possible failure scenarios, wherein the failover plan does not violate any of the one or more constraints; and executing the failover plan at the failover target.

In yet another aspect thereof, the exemplary embodiments provide a data processing system that comprises at least one data processor connected with at least one memory that stores computer program instructions for evaluating a computing environment by performing auditing of a fault tolerance ability of the computing environment to tolerate each of a plurality of failure scenarios, constructing a failover plan for each of the plurality of scenarios, identifying one or more physical resource limitations which constrain the fault tolerance ability, and identifying one or more physical resources to be added to the computing environment to tolerate each of the plurality of failure scenarios.

DETAILED DESCRIPTION

The present disclosure describes methods, systems, and computer program products that significantly improve the quality of failover planning by allowing the expression of a wide and extensible range of considerations. These considerations include, for example, any of multidimensional resource consumption, multidimensional resource availability, architectural considerations, security constraints, location constraints, and policy considerations. An illustrative example of a policy consideration is energy-favoring versus performance-favoring. One or more of these constraints are then used to calculate a pseudo-optimal placement of application resources on a failover target for each possible failure scenario. Each such failover plan is guaranteed not to violate any constraints. This planning system can also be used to determine the optimal physical servers upon which to place new application resources, and it can be used to assess any given failover plan, however created, for violation of any constraints. Each such failover plan globally distributes failed resources across all physical servers in the cluster based on optimizing across a wide range of considerations.

Figure 1:
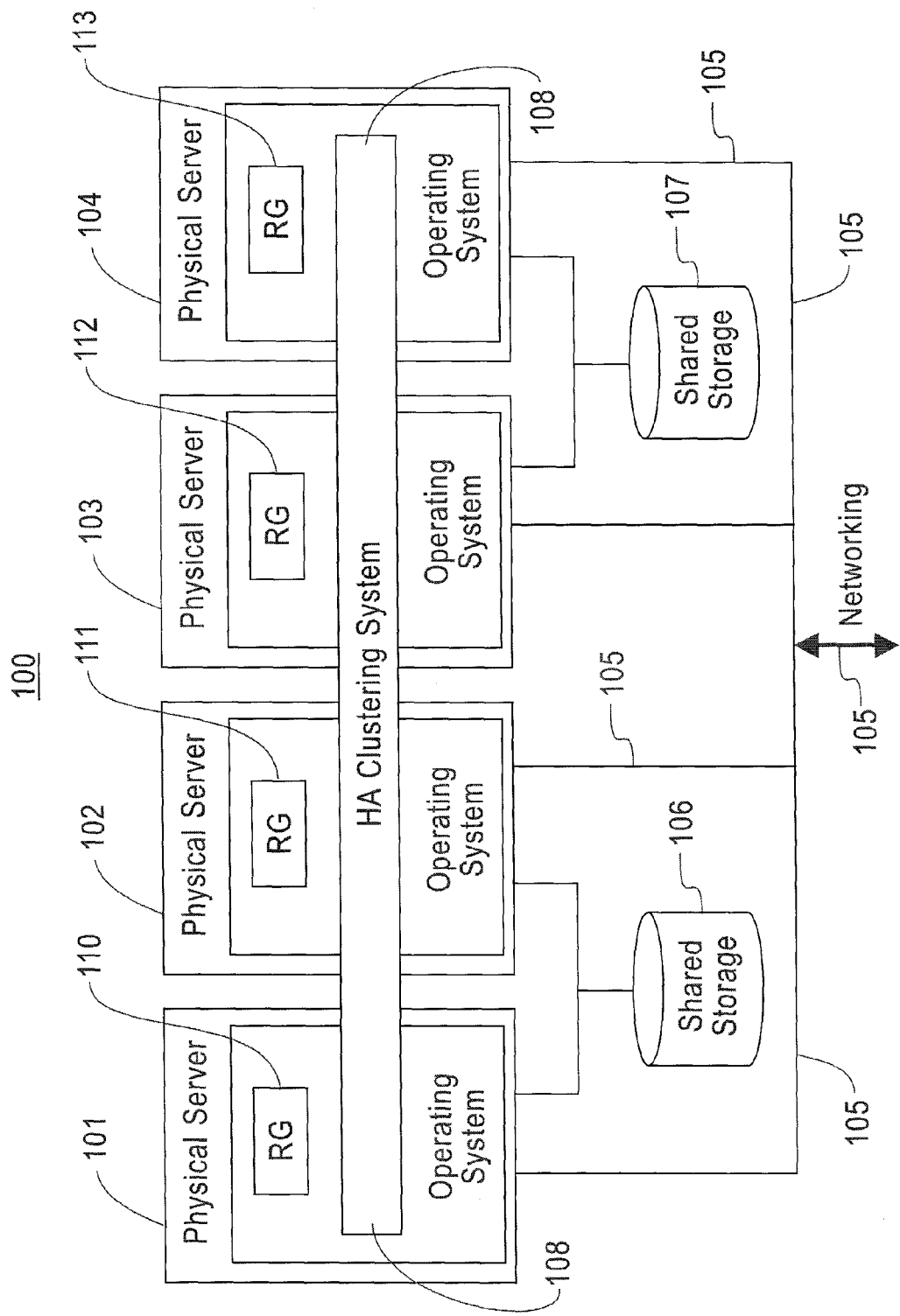
FIG. 1 is a hardware block diagram illustrating an exemplary High Availability (HA) clustering system in which various exemplary embodiments of the invention may be implemented.

FIG. 1 is a hardware block diagram illustrating a computing environment comprising an exemplary High Availability (HA) cluster 100 in which various exemplary embodiments of the invention may be implemented. The HA cluster 100 includes a clustering system 108 coupled to a plurality of physical servers 101, 102, 103 and 104 (or "nodes"). The physical servers 101, 102, 103, and 104 are interconnected through networking 105 and connected to a persistent shared storage such as a first shared storage 106 and a second shared storage 107. Illustratively, some or all of the networking 105 interconnections are redundant. Likewise, some or all of the connections to the first and second shared storage 106 and 107 could, but need not, be redundant. An application comprises one or more Resource Groups (RGs) 110, 111, 112, and 113 that are to be kept running by the HA clustering system 108. The RGs 110, 111, 112, and 113 are controlled by a start mechanism, a stop mechanism, and a monitoring mechanism. One or more of the start mechanism, the stop mechanism, and the monitoring mechanism may, but need not, be implemented using a standardized mechanism. One or more of the RGs 110, 111, 112, and 113 may include any application resources whose availability must be maintained, such as a process, process group, container, IP number, or file system.

The HA clustering system 108 monitors the operational condition of the RGs 110, 111, 112, and 113 via the monitoring mechanism. If one or more RGs 110, 111, 112, and 113 fails, the HA clustering system 108 executes the start mechanism locally. If a node hosting a collection of RGs 110, 111, 112 and 113 fails, as determined by the HA clustering system 108 group membership protocols, the HA clustering system 108 executes the start mechanism for the affected RGs 110, 111, 112, and 113 on pre-designated failover targets. Not all nodes (i.e., Physical Servers 101, 102, 103 and 104) need be connected to the same shared storage 106, 107 and networking 105 resources, so it is important for the HA clustering system 108 to fail over RGs 110, 111, 112, and 113 to nodes having access to the requisite resources.

Present-day HA clustering system 108 capabilities for determining failover targets are somewhat rudimentary. In many cases, it is left up to the user to manually specify failover targets for each RG 110, 111, 112, and 113. This may give an illusion of confidence and control, but quickly becomes intractable as the size and complexity of the HA clustering system 108 increases. Alternatively, the HA clustering system 108 may simply fail over all RGs 110, 111, 112, and 113 to the least-loaded node.

Figure 2:
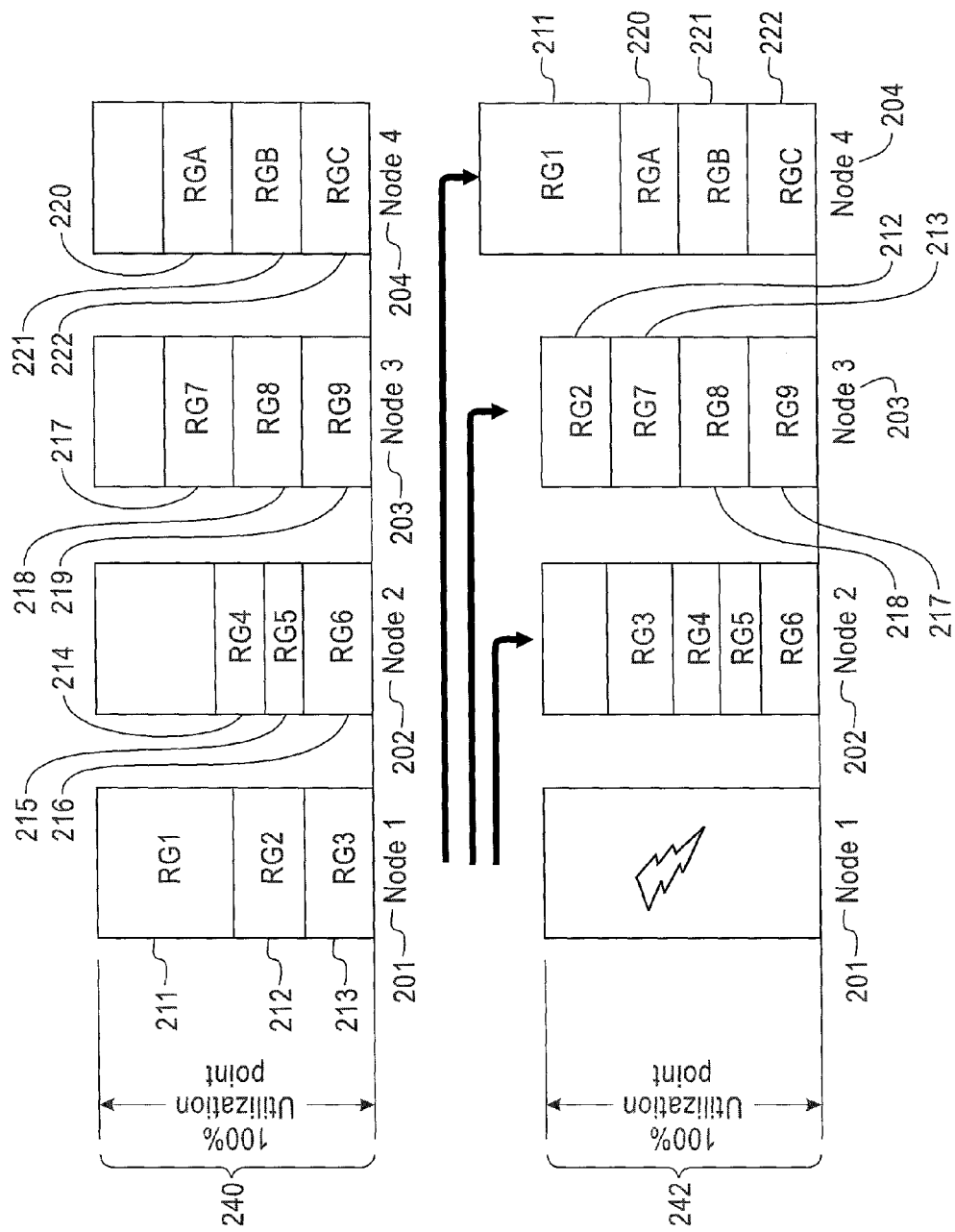
FIG. 2 is a hardware block diagram illustrating resource utilization before and after a naïve failover plan.

FIG. 2 is a hardware block diagram illustrating resource utilization before and after a so-called naïve failover plan. An upper portion 240 of FIG. 2 illustrates resource utilization prior to execution of the failover plan, whereas a lower portion 242 of FIG. 2 illustrates resource utilization after execution of the failover plan. Before the failover, each of a plurality of nodes, including a node 1 201, a node 2 202, a node 3 203, and a node 4 204, are all comfortably under the 75% utilization level. Illustratively, the node 1 201, the node 2 202, the node 3 203, and the node 4 204 may each be implemented using one or more physical servers. The node 1 201 hosts a plurality of RGs including an RG1 211, an RG2 212, and an RG3 213. The node 2 202 hosts a plurality of RGs including an RG4 214, an RG5 215, and an RG6 216. The node 3 203 hosts a plurality of RGs including an RG7 217, an RG8 218, and an RG9 219. The node 4 204 hosts an RGA 220, an RGB 221, and an RGC 222. Assume that RG1 211, RG2 212, and RG3 213 are naively failed over to node 2 202, which for purposes of the present example, is the least-loaded node of node 1 201, node 2 202, node 3 203 and node 4 204 prior to failover. This condition results in an overload of node 1 201 after failover, while the other nodes including node 2 202, node 3 203 and node 4 204 remain underutilized.

Figure 3:
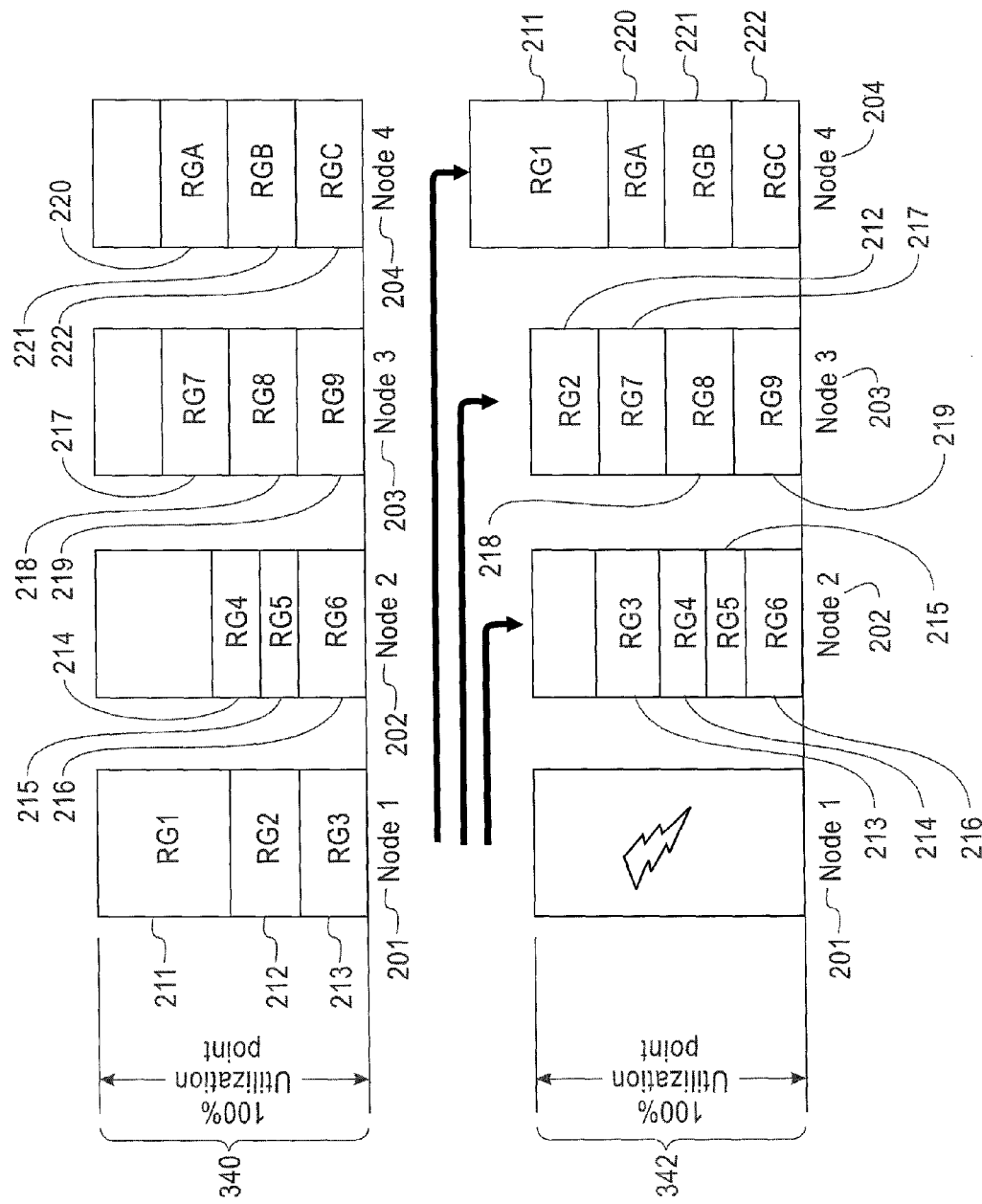
FIG. 3 is a hardware block diagram illustrating resource utilization before and after an equitable failover plan.

FIG. 3 is a hardware block diagram illustrating resource utilization before and after a so-called equitable failover plan. An upper portion 340 of FIG. 3 illustrates resource utilization prior to execution of the failover plan, whereas a lower portion 342 of FIG. 3 illustrates resource utilization after execution of the failover plan. Pursuant to the equitable failover plan, one or more RGs, such as RG1 211, could be equitably failed over across all nodes in a cluster, including node1 201, node 2 202, node 3 203, and node 4 204, with the intent being to balance the resource count across all of these nodes without regard to resource utilization. The example of FIG. 3 illustrates a case where this strategy equitably distributes RG1 211, RG2 212, RG3 213, RG4 214, RG5 215, RG6 216, RG7 217, RG8 218, RG9 219, RGA 220, RGB 221, and RGC 222 across all surviving nodes including node 2 202, node 3 203, and node 3 203, yet results in uneven workload distribution and in the case of node 4 204, an overload.

Although the examples of FIGS. 2 and 3 show consumption of a single resource by an RG such as RG1 211, in reality RGs consume many resources (CPU, memory, disk, network bandwidth, storage bandwidth, and other OS resources), any of which can become overloaded and all of which must be considered when constructing a viable failover plan.

Figure 4:
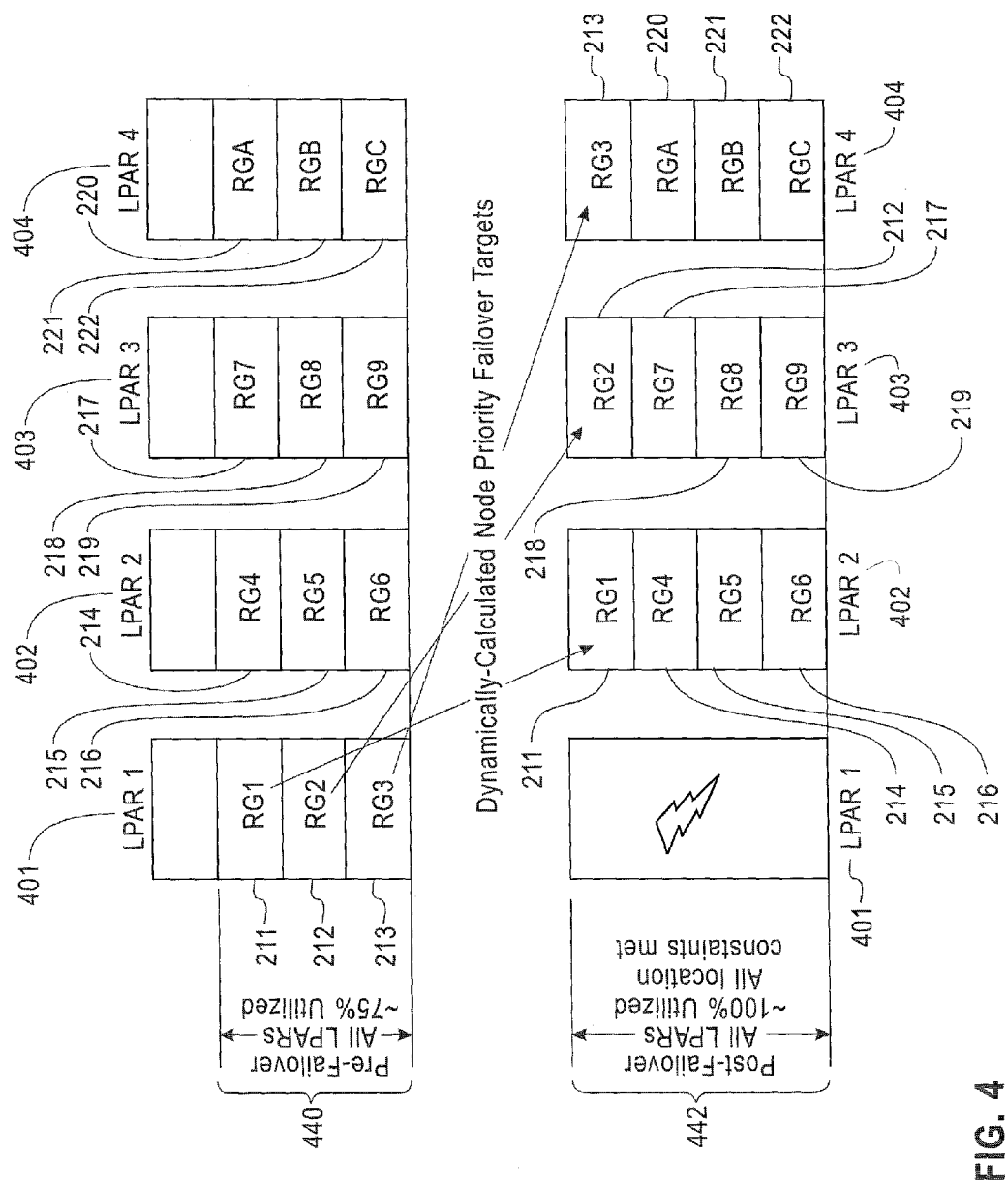
FIG. 4 is a hardware block diagram illustrating resource utilization before and after a dynamic failover plan in accordance with various exemplary embodiments of the invention.

FIG. 4 is a hardware block diagram illustrating resource utilization before and after a dynamic failover plan. An upper portion 440 of FIG. 4 illustrates resource utilization prior to execution of the failover plan, whereas a lower portion 442 of FIG. 4 illustrates resource utilization after execution of the failover plan. Pursuant to FIG. 4, a multidimensional resource utilization level for each RG including RG1 211, RG2 212, RG3 213, RG4 214, RG5 215, RG6 216, RG7 217, RG8 218, RG9 219, RGA 220, RGB 221, and RGC 222 is measured. A resource capacity of each node is measured. In the example of FIG. 4, each of respective nodes comprises a corresponding logical partition (LPAR) such as an LPAR 1 401, an LPAR 2 402, an LPAR 3 403 and an LPAR 4 404. All location, collocation, and anticollocation constraints are harvested from the HA clustering system 108 (FIG. 1), and a failover plan is computed in real time. Based upon these inputs, a failover plan is computed so as to ensure that no resource consumption threshold is exceeded in any dimension, all resources are balanced equitably, and no location or other constraints are violated. The failover plan specifies a node and/or an LPAR to which each RG is to be transferred to if a node or LPAR hosting the RG fails. In many practical applications, the computational cost of determining the failover plan in accordance with the example of FIG. 4 is sufficiently low that the failure plan can be determined periodically (illustratively, once per minute) or on-demand to ensure that an up-to-date failover plan is always available.

Figure 5:
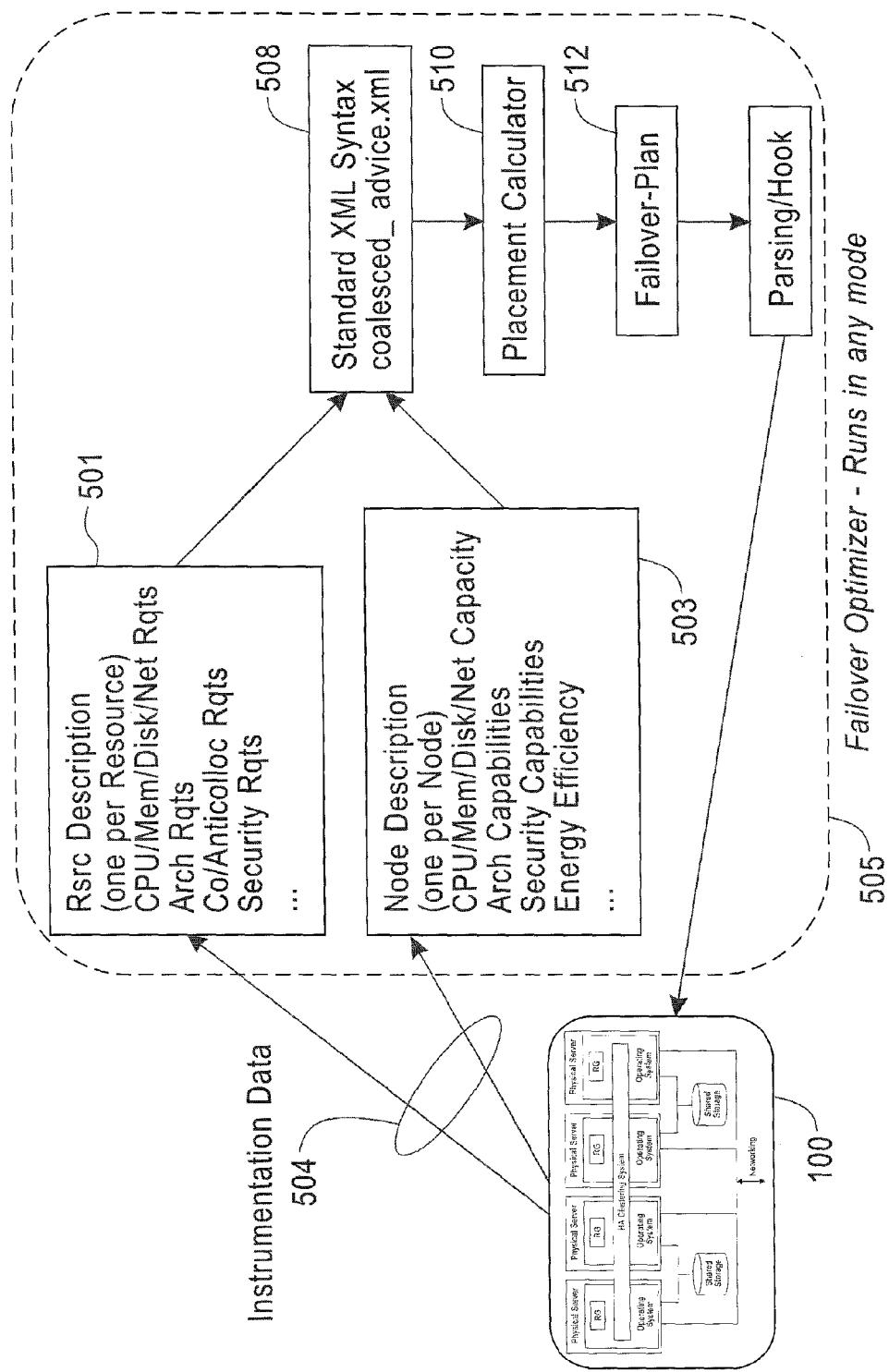
FIG. 5 is a block diagram setting forth an illustrative information flow for implementing the dynamic failover plan of FIG. 4 in accordance with various exemplary embodiments of the invention.

FIG. 5 is a block diagram setting forth an illustrative information flow for implementing the dynamic failover plan of FIG. 4 in accordance with various exemplary embodiments of the invention. An HA cluster 100 (FIGS. 1 and 5) includes a collection of nodes such as physical servers 101, 102, 103 and 104 (FIG. 1), operating systems, the HA clustering system 108, and a plurality of application resource groups (RGs) such as RG 110, RG 111, RG 112, and RG 113. The HA cluster 100 (FIG. 5) sends instrumentation data 504 to a failover optimizer 505. The failover optimizer may comprise computer-executable code stored on a computer readable memory. The failover optimizer 505 may be executed on any node, such as any of the physical servers 101, 102, 103 or 104 (FIG. 1).

The instrumentation data 504 (FIG. 5) includes resource descriptions 501 and node descriptions 503. More specifically, the resource descriptions 501 characterize each RG of RG 110, RG 111, RG 112, and RG 113 (FIG. 1), illustratively by the RG's resource consumption, its location and collocation requirements, and its architectural and security requirements as pertains to placement constraints. The node descriptions 503 (FIG. 5) characterize each node, including each of physical servers 101, 102, 103 and 104 (FIG. 1) by a small data set that illustratively describes each node's resource capacities, its architectural and security capabilities, and parameters describing its energy efficiency (to support energy-optimizing failover planning). The resource descriptions 501 and the node descriptions 503 (FIG. 5) can be collected periodically as data sets received from the HA cluster 100 (FIGS. 1 and 5) to facilitate up-to-date decisions about failover planning.

When a failover plan is desired, these data sets are transformed into a standard XML syntax 508 (FIG. 5) and input into a placement calculator 510, which then produces another standard XML file that represents a failover plan 512 for each RG. The failover plan 512 is then parsed and consumed by the HA clustering system 108 (FIG. 1) in whatever syntax is appropriate.

For each RG 110, 111, 112, and 113 (FIG. 1), a multidimensional set of metrics may be collected and used. These metrics may include, but are not limited to, any of CPU utilization, memory utilization, network bandwidth utilization, and storage utilization. It may not always be easy to collect these metrics for the RGs 110, 111, 112, and 113. These RGs 110, 111, 112, and 113 can generate sprawling and disconnected process trees and subsystem usages that are not always readily traceable to an originating RG. Therefore, any of at least three different approaches may be employed in order to approximately specify an RG's resource usage. First, a user can specify an RG's resource requirements at the time of RG instantiation. This is usually known ahead of time because it is necessary to size the system to run a specific RG. However, if the user does not know or wish to input this parameter, then the user has the option of designating a list of executables that in general comprise the RG. In the case where a list of executables is designated, the system of FIG. 1 will map this list into the appropriate set of processes and obtain the metrics for that set of processes. Finally, the user may have no information to provide, in which case an attempt may be performed to trace a process tree emanating from an originating RG process, and aggregate metrics are retrieved from a set of processes on the traced process tree. In all cases, it must be understood that precise metrics are not available, and in general will comprise an underestimate of a given RG's resource utilization.

In addition to collecting the resource utilization of each RG 110, 111, 112, and 113 the HA system 100 may be provided with one or more interfaces to harvest a set of location, collocation, and anticollocation constraints for each RG 110, 111, 112, and 113. For each node such as, for example, each physical server 101, 102, 103, 104, the overall capacity for each of these metrics is also measured. In addition, the nodes or physical servers 101, 102, 103, 104 typically have limits as to how many RGs 110, 111, 112, 113 can be running on or hosted by a particular physical server, so this limit is added to the list of node constraints that must not be exceeded by any viable failover plan.

Figure 6:
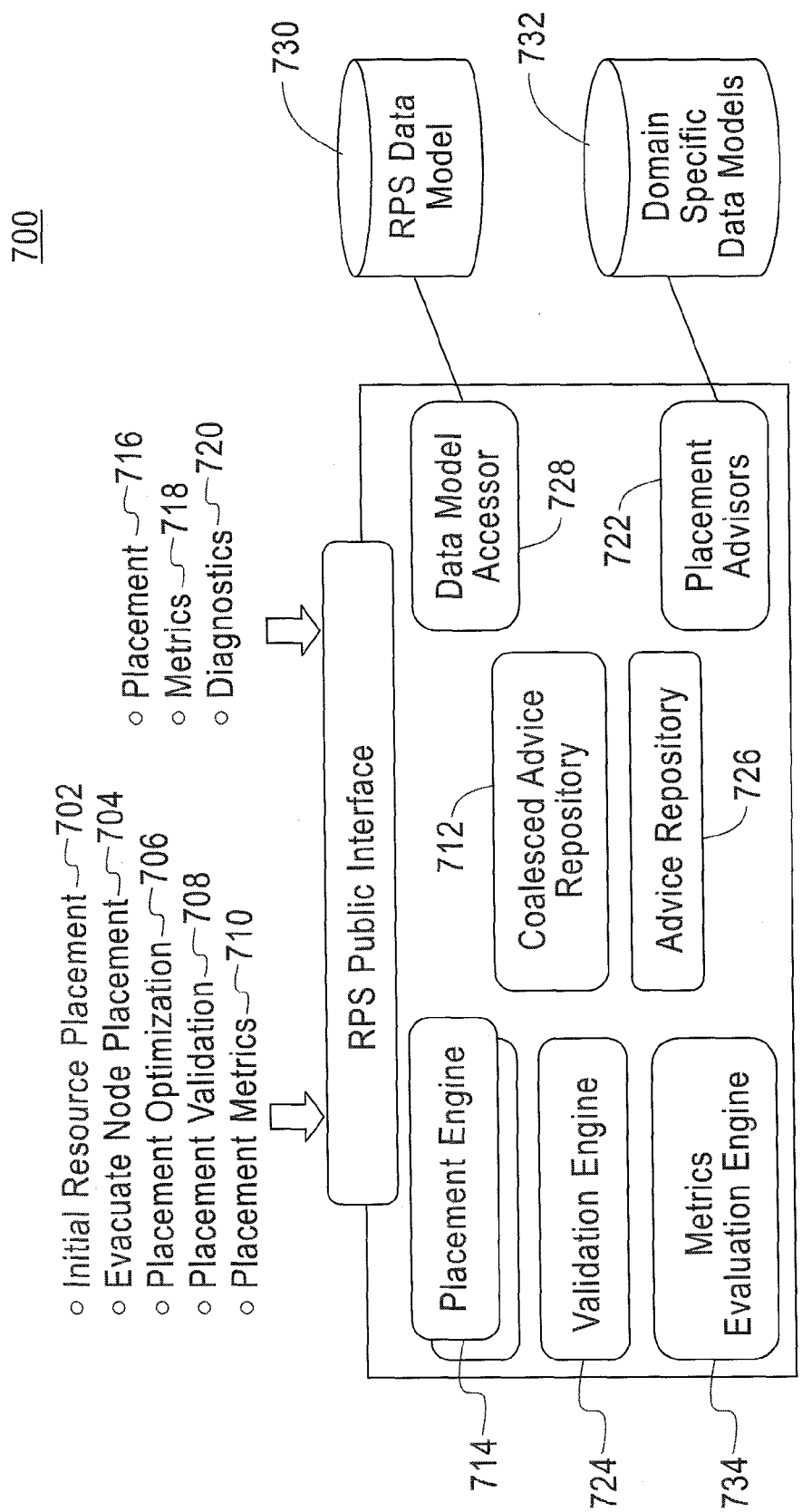
FIG. 6 is an architectural block diagram setting forth an illustrative Resource Placement Service (RPS) for implementing various exemplary embodiments of the invention.

FIG. 6 is an architectural block diagram setting forth an illustrative Resource Placement Service (RPS) for implementing various exemplary embodiments of the invention. One illustrative method for calculating a failover plan is to use Virtual Resource Placement Services (VRPS) technology that was originally developed to place Virtual Machines in a Virtual System Farm [VRPS Patent—INVENTORS: PLEASE PROVIDE CITATION OF PATENT PUBLICATION NUMBER OR PATENT NUMBER]. VRPS was designed to be a general-purpose systems management aid and has found use in a variety of projects. Since failover plan calculation involves resource placement, the term Resource Placement Service (RPS) will be used hereinafter to describe this resource placement function.

With reference to FIG. 6, an RPS 700 may be conceptualized as a calculator that, given one or more input parameters, produces an answer to a resource placement question. These input parameters are used to describe a plurality of nodes, or a plurality of resources, or both a plurality of nodes as well as a plurality of resources. The input parameters may include any of an initial resource placement 702, an evacuate node placement 704, a placement optimization 706, a placement validation 708, and/or a set of placement metrics 710. The RPS 700 is essentially a calculator that, based upon the input parameters and information stored in a coalesced advice repository 712, solves one or more of five problems as follows: (1) provides an initial placement for a set of resources; (2) provides a placement 716 for a set of resources that are on a node that is to be evacuated; (3) optimizes an existing placement by shuffling around at most a defined number of resources; (4) validates an existing placement to ensure that all hard constraints are met; and/or (5) assesses the quality of a placement according to a given set of placement metrics 710.

Based upon the input parameters, the RPS 700 provides one or more output parameters such as a placement 716. In addition to, or in lieu of, providing the placement 716, the RPS 700 may also determine one or more metrics 718 or provide one or more diagnostics 720. The RPS 700 calculates the one or more output parameters using any of a placement engine 714, a validation engine 724, and a metrics evaluation engine 734. The RPS 700 may optionally have the capability to support multiple placement engine 714 algorithms. This allows experimentation with and selection of the best or the optimal algorithm for a given domain. The Placement Engine 714 may illustratively utilize a multidimensional binpacking algorithm that is described hereinafter. The RPS 7800 also includes an advice repository 726, a data model accessor 728 coupled to an RPS data model 730, and domain specific data models 732 coupled to the placement advisors 722. A regularized "advisor interface" and constraint language have been defined to allow an extensible number of domain placement advisors 722 to inform the placement calculation, as will be described in more detail with regard to FIG. 7.

Figure 7:
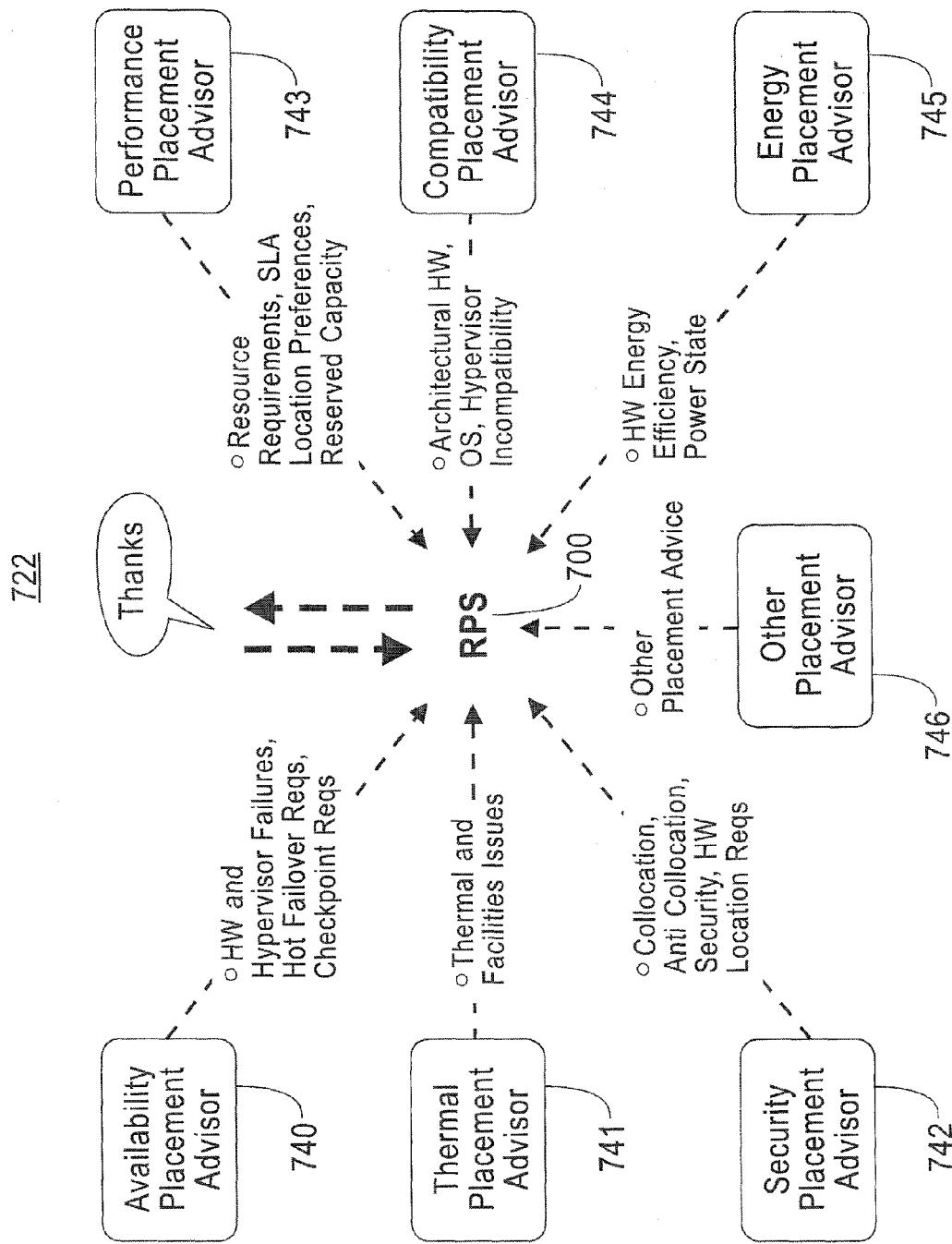
FIG. 7 is an architectural block diagram setting forth an illustrative implementation of the placement advisors shown in FIG. 6.

FIG. 7 is an architectural block diagram setting forth an illustrative implementation of the placement advisors 722 shown in FIG. 6. In the example of FIG. 7, the placement advisors 722 include an availability placement advisor 740, a thermal placement advisor 741, a security placement advisor 742, a performance placement advisor 743, a compatibility placement advisor 744, an energy placement advisor 745, and an other placement advisor 746. One or more of the placement advisors 740-746 input domain advice into the RPS 700. The RPS 700 integrates and resolves all of the received domain advice into a single set of advice that is stored in the coalesced advice repository 712 (FIG. 6). The single set of advice is used by the RPS 700 to calculate the one or more output parameters as previously described with reference to FIG. 6. Preference advice conflicts are resolved (and annotated) by advisor priority based on policy, e.g., energy versus performance versus thermal. Hard advice conflicts result in an error that will terminate the placement calculation by the RPS 700.

The placement advisors 722 (FIGS. 6 and 7) use RPS advice language that allows any placement advisor 740-746 to provide the following types of advice: (1) ResourceDemandAdvice indicates the capacity requirement for an RG 110-113 (FIG. 1) in terms of resources (CPU, RAM); (2) ResidualCapacityAdvice allows residual capacity to be reserved on nodes such as physical servers 101-104; (3) RGLocationAdvice defines possible placements of RGs 110-113 to the nodes; (4) RGCollocationAdvice defines Collocation and Anti-Collocation requirements of all RGs 110-113 in a cluster; (5) PhysicalEntityPreferenceAdvice describes an RG-independent measurement that specifies an absolute desirability of a node, such as any of physical servers 101-104, as a placement target for an RG 110-113 from the perspective of a given advisor; (6) FrozenPhysicalEntityAdvice defines nodes that cannot have any new RGs 110-113 placed on them; and (7) LockedRGAdvice defines RGs 110-113 whose placement should not be updated.

Figure 8:
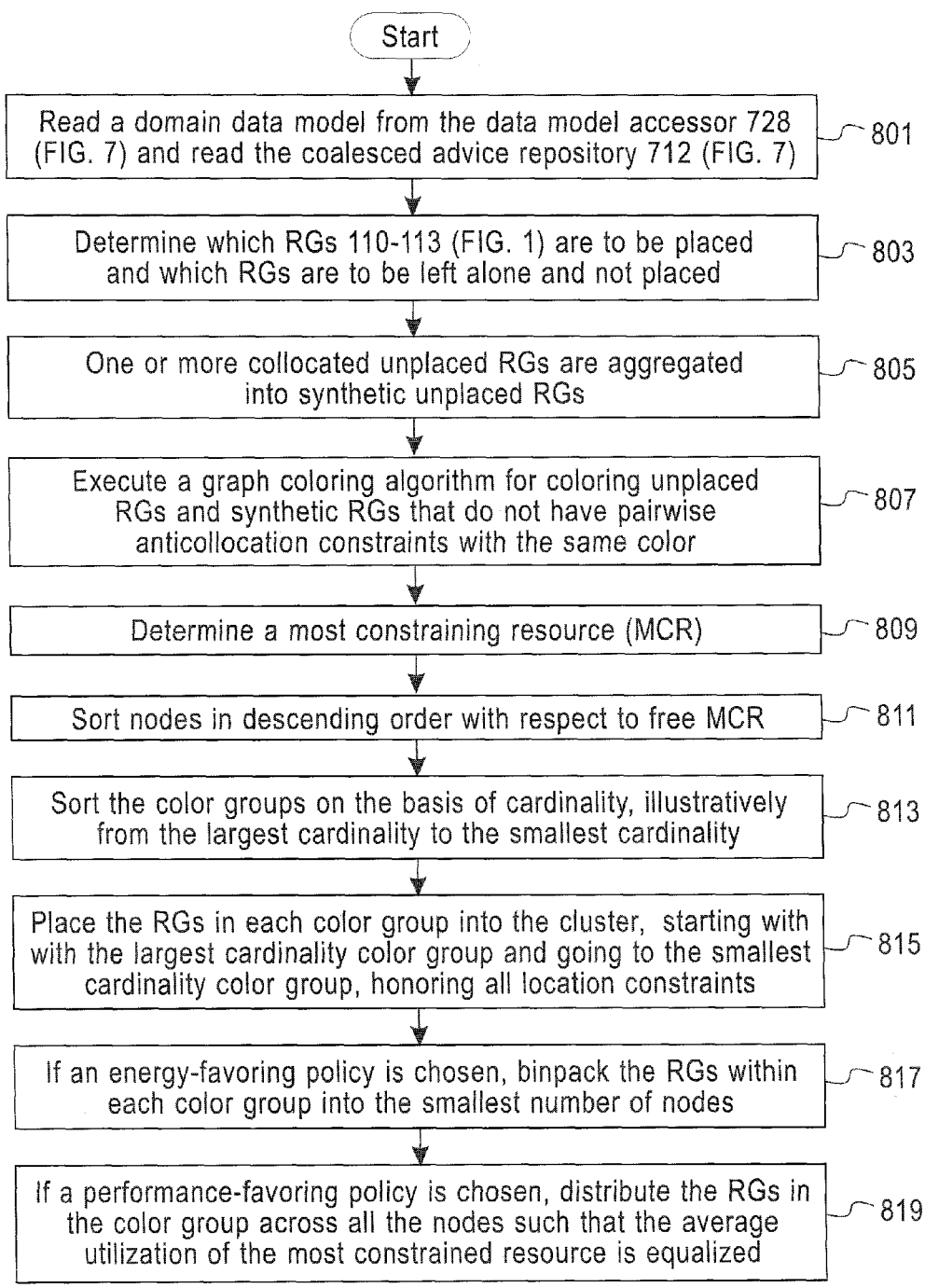
FIG. 8 is a flowchart illustrating a non-limiting example of a method for practicing the exemplary embodiments of the invention.

FIG. 8 is a flowchart illustrating a non-limiting example of a method for practicing the exemplary embodiments of the invention. The method may be executed, for example, by the RPS 700 (FIGS. 6 and 7). The method has been shown to yield efficient placements across a wide range of applications. Referring now to FIG. 8, the method commences at block 801 where a domain data model from the data model accessor (FIG. 7, block 728) is read and the coalesced advice repository (712) is also read. Next, at block 803 (FIG. 8), it is determined which RGs 110-113 (FIG. 1) are to be placed and which RGs are to be left alone and not placed. At block 805 (FIG. 8), one or more collocated unplaced RGs are aggregated into synthetic unplaced RGs. A graph coloring algorithm is executed (block 807), coloring unplaced RGs and synthetic RGs that do not have pairwise anticollocation constraints with the same (i.e., identical) color. This same color may be selected, for example, from among a plurality of predefined colors. Coloring may be accomplished by associating these unplaced RGs and synthetic RGs with a color group selected from a plurality of color groups, wherein each color group represents a predefined color. In this manner, one or more RGs in the same color group can be placed with relative ease.

At block 809, a most constraining resource (MCR) is determined. The nodes are sorted in descending order with respect to free MCR (block 811). This is to prepare for eventual binpacking if specified by policy. Next, sort the color groups from largest cardinality to smallest (block 813). Place the RGs in each color group into the cluster, starting with the largest and going to smallest cardinality color group, honoring all location constraints (block 815). If an energy-favoring policy is chosen, binpack the RGs within each color group into the smallest number of nodes (block 817). If a performance-favoring policy is chosen, distribute the RGs in the color group across all the nodes such that the average utilization of the most constrained resource is equalized (block 819).

A nominal use case for failover planning is a priori (periodic or on-demand) invocation, prior to the occurrence of a failure. This is to ensure that any metrics data from a failed node have been harvested before that node becomes unavailable, as well as to minimize the path length of failure handling. Failover plans are calculated by asking the RPS 700 (FIGS. 6 and 7) to provide a placement corresponding to an evacuation of each node (physical servers 101-104, FIG. 1) in the cluster 100, one at a time, using an Evacuate Node Placement API call. In response, the RPS 700 (FIGS. 6 and 7) locks all the RGs 110-113 (FIG. 1) in the cluster 100, orphans an RGs on a node to be evacuated, freezes that node, and calculates a placement for the orphaned RGs. This failover plan is then distributed to all nodes in the cluster 100. If a failover plan is needed to accommodate the failure of multiple nodes, the Evacuate Node Placement API call can be provided with a list of nodes to be evacuated, and an appropriate failover plan will be calculated, if feasible.

In addition to providing failover plans, the RPS 700 (FIGS. 6 and 7) can be used to provide an initial placement for a set of RGs 110-113 (FIG. 1) by invoking an Initial Resource Placement API call. The RPS 700 (FIGS. 6 and 7) can also be used to optimize the placement of RGs 110-113 (FIG. 1) across the cluster by invoking a Placement Optimization API call. In addition, the RPS 700 (FIGS. 6 and 7) can also be used to validate that an existing failover plan, however obtained, meets all constraints by providing a placement corresponding to a proposed failover plan, and executing its Placement Validation API call.

The failover planning technology described herein is generally applicable to all HA clustering technologies. A prototype has been implemented in an IBM PowerHA clustering environment. In this environment, operating system instances run in virtual machines called Logical Partitions (LPARs) 401-404 (FIG. 4), which play the role of nodes in the cluster 100 (FIG. 1). Distributed heartbeat algorithms and virtually synchronous group consensus protocols are used to determine which nodes are operationally healthy, and which are deemed failed. In the case of failures, affected RGs 211-222 (FIG. 4) are restarted on designated failover target nodes. The PowerHA clustering environment has a capability called Dynamic Node Priority (DNP) that can determine at failover time where any given RG should failover. DNP is a pluggable and extensible mechanism whereby a custom script can be created that interrogates the failover plans that are produced using the methods and systems described above, and determines the appropriate failover location.

Optimal failover planning relies upon knowledge of the resource utilizations of the RGs 211-222 (FIG. 4). However, it can be difficult to conclusively determine the resource utilization of all constituents of an RG, so any of the following cases may be supported: (1) user-specified resource utilizations; (2) a list of user-specified executables; (3) discovered based on a process tree—by root PID, by group, or based on tracking all process creations via registering for an AIX pro-caddhandler callback function which is invoked whenever a new process is created. In cases (2) and (3) where metrics can be collected dynamically, the following AIX tools can be utilized:

1. CPU:
   Process Level:
      topas -P
      getpinfo
      getprocs64
   LPAR Level:
      lparstat
      mpstat
      perfstat_cpu_total
      perfstat_partition_total
2. Memory:
   Process Level:
      svmon -P w/ -O Filter
   LPAR Level:
      svmon -G w/ -O Filter
      perfstat_memory_total
      perfstat_memory_page
3. Disk:
   Process Level:
      AIX Trace Utility
      filemon command
   LPAR Level:
      iostat -D
      topas -D
      perfstat_disk
4. Network:
   Process Level:
      AIX Trace Utility
      netpmon Command
   LPAR Level:
      netstat, entstat
      topas -E
      perfstat_netinterface
      perfstat_protocol
(END OF PROGRAM LISTING)

Figure 10:
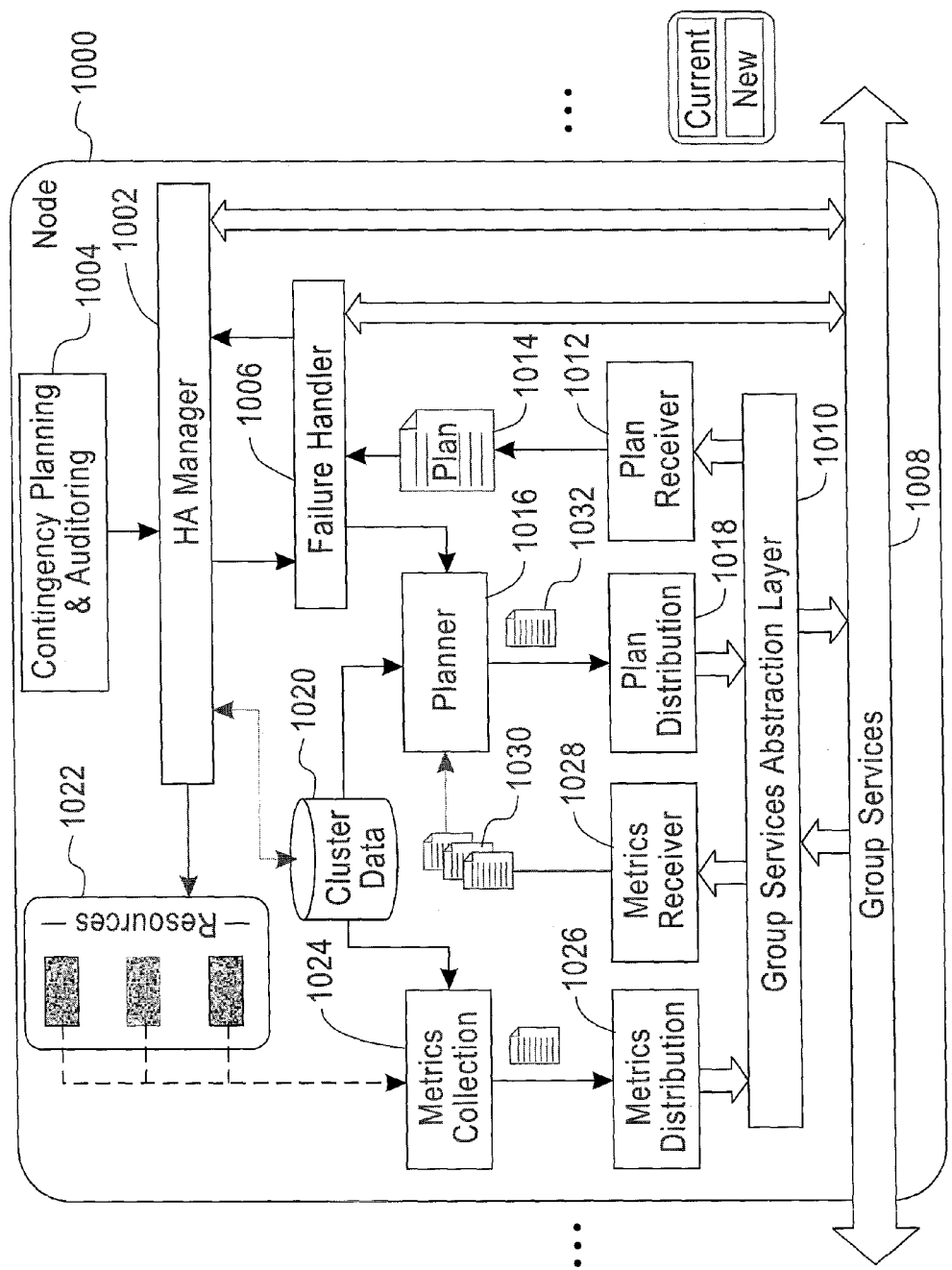
FIG. 10 is a detailed architectural and functional view of a node 1000 equipped to implement the exemplary embodiments of the invention.

FIG. 10 is a detailed architectural and functional view of a node 1000 equipped to implement the exemplary embodiments of the invention. Resource group collocation and anti-collocation constraints for a plurality of resources 1022 may be harvested from an HA manager 1002 using one or more PowerHA clvt API calls as follows:

clvt -S -c -a GROUPS query dependency TYPE=SAME_NODE
   clvt -S -c -a GROUPS query dependency TYPE=DIFFERENT_NODE Metrics and constraint collections can be run periodically (on the order of once per minute) on each node 1000 in a cluster, asynchronously relative to other nodes. A metrics collection 1024 function collects and time-series averages a set of metrics for RGs 211-222 (FIG. 4) and/or LPARs 401-404 of its own node 1000 (FIG. 10). A metrics distribution 1026 function distributes the metrics atomically to all nodes using group services 1008. This ensures that all nodes have congruent copies of each node's metrics at any virtually synchronous point. The results are placed in well known locations that are accessible to a planner 1016 function.

Figure 9:
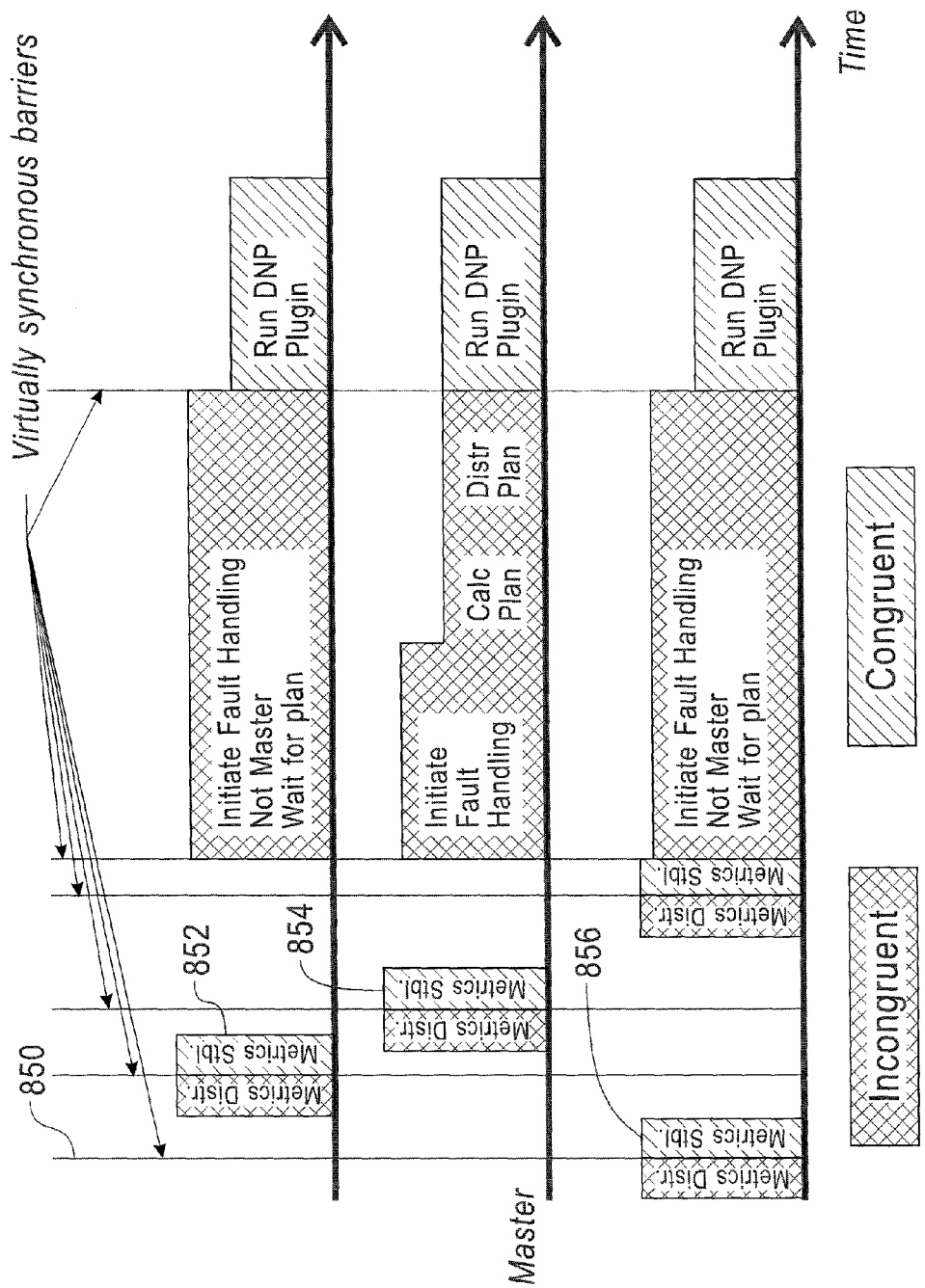
FIG. 9 is a graph showing exemplary virtually synchronous barriers as a function of time for a failure handler function.

FIG. 9 is a graph showing exemplary virtually synchronous barriers as a function of time for a failure handler function.

The planner 1016 function (FIG. 10) runs when invoked by the failure handler 1006 function. Initiation of the failure handler 1006 function and the metrics distribution 1026 function are virtually synchronous relative to each other. This is achieved by adding a virtually synchronous barrier 850 (FIG. 9) denoting initiation of the failure handler 1006 (FIG. 10) function. Because initiation of the failure handler 1006 function is a virtually synchronous action, all nodes (such as node 1000) have congruent metrics 852, 854, 856 (FIG. 9) at failure handling time. Hence, at the point of failure handling, all nodes are provided with congruent metrics and a congruent list 1030 of all nodes and node states, RGs and RG states, and location constraints. The congruent list 1030 is received from the group services abstraction layer 1010 by a metrics receiver 1028.

The planner 1016 function can either run on a single node (e.g., the lowest or highest-numbered node in the HA clustering system 108 (FIG. 1) authoritative list of nodes in the cluster), or on all nodes in the cluster since the calculation is deterministic given identical inputs. In a "Master Planner" implementation, a single distinguished node executes the planner 1016 (FIG. 10) function and atomically distributes the plan to all nodes as a group-wise virtually synchronous action. In a "Distributed Planner" implementation, all nodes execute the planner as a group-wise virtually synchronous action. Since inputs are identical and the computation is deterministic, all nodes compute identical plans. In execution, the planner 1016 function collects the most recent metrics and constraints as of the last point in virtual synchrony, converts them into a regularized XML format, and iterates through the Evacuate Node Placement API call as described previously.

The HA clustering system 108 (FIG. 1) has the ability to handle the failure of multiple nodes (such as two or more physical servers 101-104), although it may perform failover handling one node at a time. In the case in which multiple nodes have failed at once, the planner 1016 (FIG. 10) "looks ahead" in a node failure queue to determine all nodes that are known to be failed at a given failure handling invocation, and then generates a plan 1032 that provides failover locations for all RGs on all known failed nodes. Although not strictly necessary for correctness, failure lookahead provides a more globally optimal failover plan than if the failures were planned for only one node at a time.

In order to assess the run time of the planner 1016, it is possible to create a simulation environment that allows one to vary the number of LPARs (such as any of LPAR1 401, LPAR2 402, LPAR 3 403, and/or LPAR 4 404, FIG. 4), and the number of RGs 211-222 per LPAR. The simulated resource consumptions and capacities are such that adequate capacity exists within the cluster 100 (FIG. 1) to absorb the workload of any single node (such as physical server 101), yet no node has the capacity to absorb the workload of any other single node without violating resource consumption constraints. Random anti-collocations between RGs 211-222 were modeled.

Figure 11:
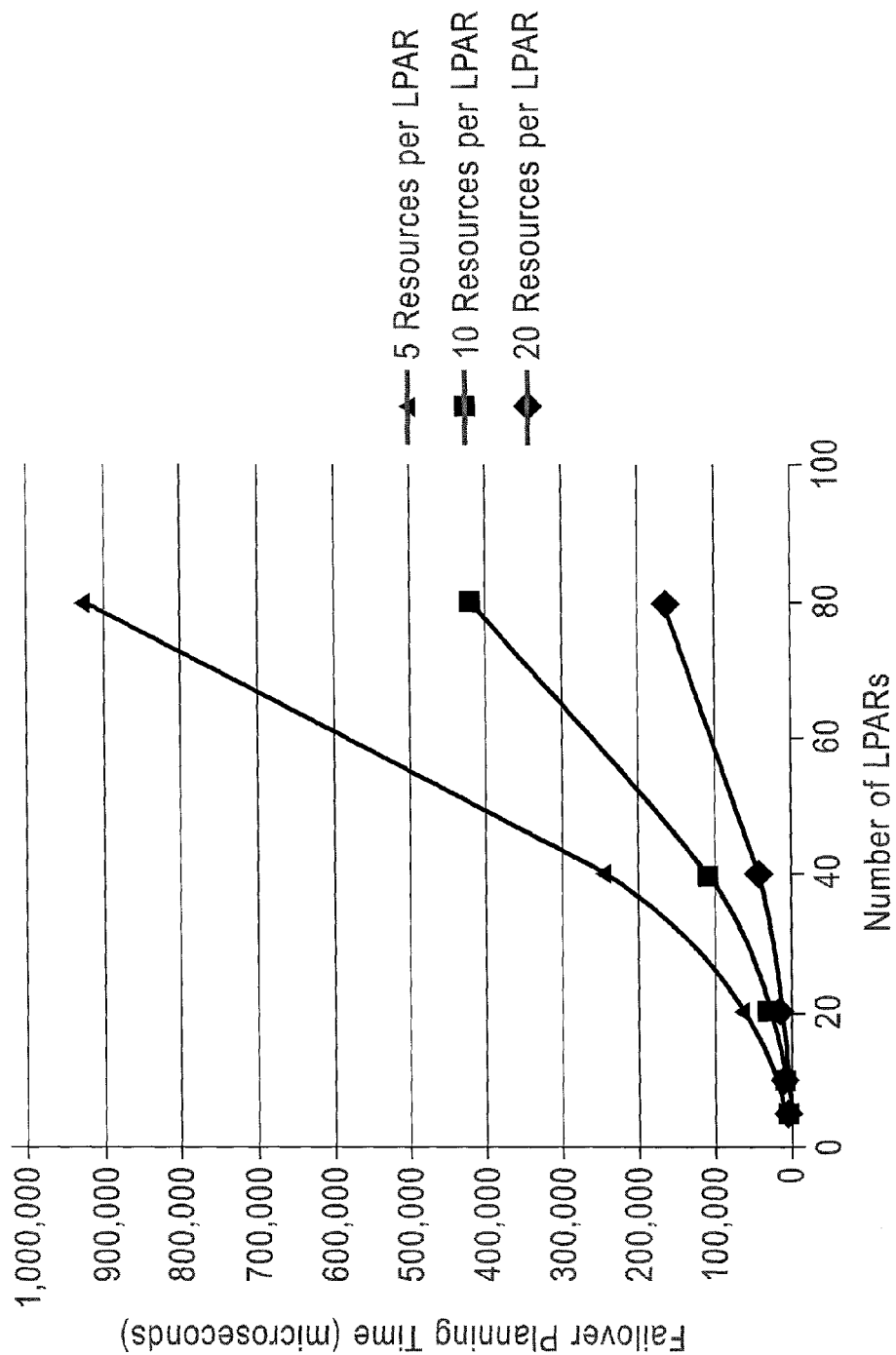
FIG. 11 is a graph of failover planning time versus number of logical partitions (LPARs) for any of the configurations shown in FIGS. 1-4 and 10.

FIG. 11 is a graph of failover planning time versus number of logical partitions (LPARs) for any of the configurations shown in FIGS. 1-4 and 10. FIG. 11 shows the time required to calculate a failover plan for a single node as a function of the number of LPARs 401-404 (FIG. 4) and the number of RGs 211-222 per LPAR. The performance metrics presented in FIG. 11 were taken using one 1.648 GHz CPU Power5 processor with 2.176 GB of RAM running AIX 6.1. It should be noted that the current maximum size of a PowerHA cluster (such as HA cluster 100, FIG. 1) is 32 LPARs, and the current maximum recommended number of RGs per LPAR is 5. In the configuration measured in FIG. 11, the failover planning for a single node takes less than one twentieth of a second. However, larger systems are certainly of interest.

The approaches described herein are capable of performing failover placement procedures so as to address any of various issues that arise. For example, nowadays clusters are rapidly growing in scale and hosting more and more consolidated workload through virtualization. Unlike traditional manual failover planning, the approaches described herein may be equipped to adaptively determine failover targets for evicted applications, considering not only static placement constraints such as collocation and anticollocation of applications, but also run-time resource requirements. The approaches described herein may also provide extensibility to support placement policies such as maximal dispersion for better performance, maximal packing for better energy efficiency, or a tradeoff somewhere in between. Illustratively, the HA cluster 100 (FIG. 1) may be implemented using an IBM PowerHA clustering solution by leveraging an existing Dynamic Node Priority interface without any internal modifications. A planning engine (planner 1016, FIG. 10) uses a multi-dimensional binpacking algorithm (FIG. 8) and produces a pseudo-optimal fail-over placement plan in less than one second for a large cluster with 80 virtual servers and total 1,600 Resource Groups.

Previous failover planners would not produce a plan if any resource constraints are violated in a proposed plan. However, this is not the best approach for a high availability system, which in general must find homes for evicted Resource Groups. Therefore, the planner 1016 (FIG. 10) is equipped to produce a "best effort" plan in which not all RGs get all the resources that they request, in the interest of finding eventual homes for all of them. The planner 1016 can handle arbitrary location, antilocation, collocation, and anticollocation constraints. However, it is known that as the anticollocation density (the number of RGs that have pair-wise anticollocation constraints divided by the total number of RGs) increases, finding a feasible plan with the approximate algorithms described herein becomes more difficult. It is of interest to explore the anticollocation density space, with respect to the resource demand on the system, find where the existing algorithms break down and enhance them. Finally, although some planning algorithms runs very fast, in the domain of cloud computing, configurations exceeding several thousand virtual servers and tens of thousands of RGs may be encountered.

As should be appreciated by one skilled in the art, aspects of the present invention may be embodied as a system, method, computer program product or as a combination of these. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document a computer readable storage medium may be any tangible, non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method comprising:
   evaluating a computing environment by performing auditing of a fault tolerance ability of the computing environment to tolerate each of a plurality of failure scenarios;
   constructing a failover plan for each of the plurality of scenarios;
   identifying one or more physical resource limitations which constrain the fault tolerance ability; and
   identifying one or more physical resources to be added to the computing environment to tolerate each of the plurality of failure scenarios:
   wherein the failover plan for each of the plurality of failure scenarios globally distributes failed resources across all physical servers in a cluster in response to at least one security constraint, or at least one policy consideration, or both.

2. The method of claim 1 further comprising performing a proactive calculation of the failover plan.

3. The method of claim 2 further comprising storing the failover plan for future use to be prepared for each of a plurality of defined failure events without having to perform a calculation at a time of failure.

4. The method of claim 1 further comprising performing an on-demand calculation of the failover plan at a time of failure, to allow an HA management system to respond to a failure event.

5. The method of claim 1 further comprising calculating the failover plan using constrained multidimensional bin packing.

6. The method of claim 1 further comprising calculating the failover plan using a set of real-time metrics.

7. The method of claim 1 further comprising calculating the failover plan using one or more clusters, a cloud, or a distributed execution environment.

8. A non-transitory machine-readable storage medium that contains computer program instructions, where the execution of the computer program instructions by at least one data processor results in performance of operations that comprise:
   evaluating a computing environment by performing auditing of a fault tolerance ability of the computing environment to tolerate each of a plurality of failure scenarios;
   constructing a failover plan for each of the plurality of failure scenarios;
   identifying one or more physical resource limitations which constrain the fault tolerance ability; and
   identifying one or more physical resources to be added to the computing environment to tolerate each of the plurality of failure scenario;
   wherein the failover plan for each of the plurality of failure scenarios globally distributes failed resources across all physical servers in a cluster in response to at least one security constraint, or at least one policy consideration, or both.

9. The non-transitory machine-readable storage medium of claim 8 further comprising computer program instructions for performing a proactive calculation of the failover plan.

10. The non-transitory machine-readable storage medium of claim 9 further comprising computer program instructions for storing the failover plan for future use to be prepared for each of a plurality of defined failure events without having to perform a calculation at a time of failure.

11. The non-transitory machine-readable storage medium of claim 8 further comprising computer program instructions for performing an on-demand calculation of the failover plan at a time of failure, to allow an HA management system to respond to a failure event.

12. The non-transitory machine-readable storage medium of claim 8 further comprising computer program instructions for calculating the failover plan using multidimensional constrained bin packing.

13. The non-transitory machine-readable storage medium of claim 8 further comprising computer program instructions for calculating the failover plan using a set of real-time metrics.

14. The non-transitory machine-readable storage medium of claim 8 further comprising computer program instructions for calculating the failover plan using one or more clusters, a cloud, or a distributed execution environment.

15. A data processing system that comprises at least one data processor connected with at least one memory that stores computer program instructions for evaluating a computing environment by performing auditing of a fault tolerance ability of the computing environment to tolerate each of a plurality of failure scenarios, constructing a failover plan for each of the plurality of failure scenarios, identifying one or more physical resource limitations which constrain the fault tolerance ability, and identifying one or more physical resources to be added to the computing environment to tolerate each of the plurality of failure scenarios;
wherein the failover plan for each of the plurality of failure scenarios globally distributes failed resources across all physical servers in a cluster in response to at least one security constraint, or at least one policy consideration, or both.

16. The data processing system of claim 15 further comprising computer program instructions for performing a proactive calculation of the failover plan.

17. The data processing system of claim 16 further comprising computer program instructions for storing the failover plan for future use to be prepared for each of a plurality of defined failure events without having to perform a calculation at a time of failure.

18. The data processing system of claim 15 further comprising computer program instructions for performing an on-demand calculation of the failover plan at a time of failure, to allow an HA management system to respond to a failure event.

19. The data processing system of claim 15 further comprising computer program instructions for calculating the failover plan using constrained multidimensional bin packing.

20. The data processing system of claim 15 further comprising computer program instructions for calculating the failover plan using a set of real-time metrics.

21. The data processing system of claim 15 further comprising computer program instructions for calculating the failover plan using one or more clusters, a cloud, or a distributed execution environment.

* * * * *